No. 888,218. PATENTED MAY 19, 1908.
F. C. BOGK, J. J. LEACH & A. W. WINGENDER.
WATER METER.
APPLICATION FILED APR. 8, 1907.

2 SHEETS—SHEET 1.

No. 888,218. PATENTED MAY 19, 1908.
F. C. BOGK, J. J. LEACH & A. W. WINGENDER.
WATER METER.
APPLICATION FILED APR. 8, 1907.

2 SHEETS—SHEET 2.

WITNESSES:
INVENTORS
ATTORNEYS

UNITED STATES PATENT OFFICE.

FREDERICK C. BOGK, JOHN J. LEACH, AND ALBERT WM. WINGENDER, OF MILWAUKEE, WISCONSIN.

WATER-METER.

No. 888,218.  Specification of Letters Patent.  Patented May 19, 1908.

Application filed April 8, 1907. Serial No. 366,898.

*To all whom it may concern:*

Be it known that we, FREDERICK C. BOGK, JOHN J. LEACH, and ALBERT W. WINGENDER, citizens of the United States, residing at Milwaukee, county of Milwaukee, and State of Wisconsin, have invented new and useful Improvements in Water-Meters, of which the following is a specification.

Our invention relates to improvements in disk water meters, and it pertains more especially to the means disclosed for centrally suspending the measuring mechanism at a single point from the upper side of its inclosing case and to the means for forming a water tight joint between the outlet duct of the measuring chamber and the outlet duct of the inclosing case.

The object of our invention is among other things to so construct the several coöperating parts of a meter and so adapt each part to the others that they may be readily and quickly assembled with the least possible loss of time and labor and that when so assembled such parts will be and remain in perfect alinement and in their proper operative relations to each other, whereby the durability of the operative mechanism of the meter is greatly prolonged, while the greatest accuracy of measurement is thereby assured.

Figure 1:
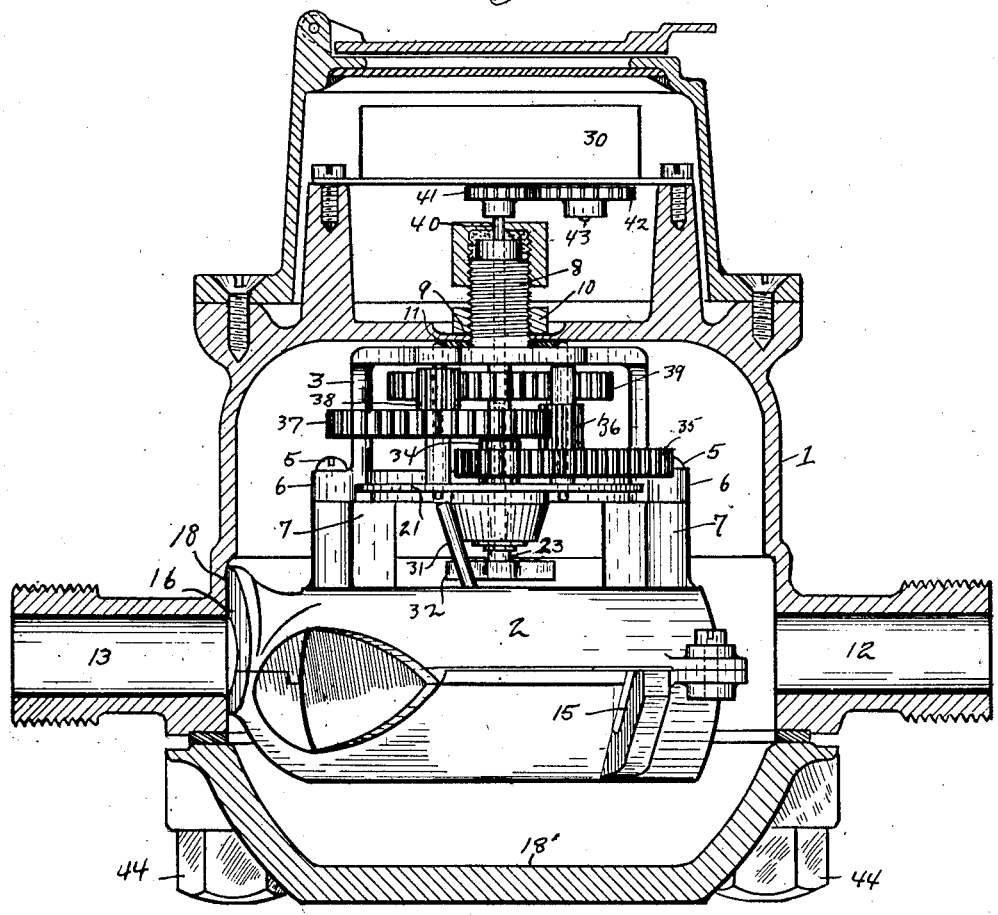
Figure 3:
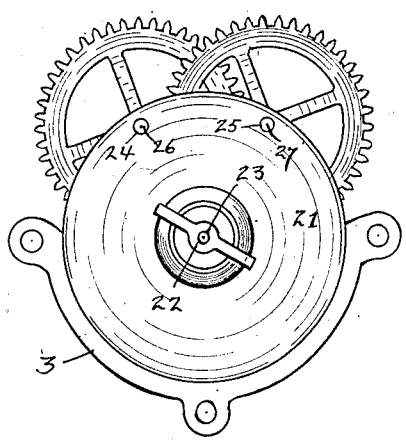
Figure 2:
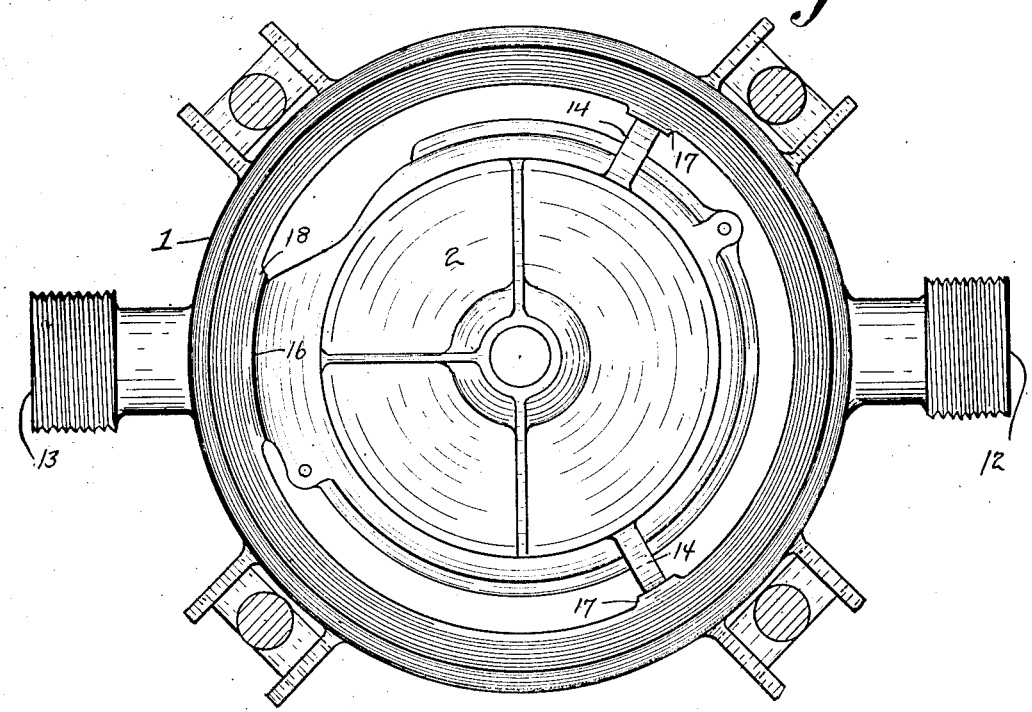

Our improvements are further explained by reference to the accompanying drawings in which, Figure 1 represents a vertical section of the housing or exterior case of the meter, showing a side view of the measuring chamber, speed reducing gears, and a side view of the chamber which contains the registering mechanism. Fig. 2 is a bottom view of the meter with the bottom of the case removed, showing the manner of retaining the measuring chamber in its proper relative position to its inclosing case, and Fig. 3 is a bottom view of the supporting frame, of the speed reducing gear and its supporting mechanism.

Like parts are identified by the same reference figures throughout the several views.

1 represents the exterior housing or inclosing case. 2 represents the measuring chamber in which the oscillating measuring disk, not shown, is located.

3 represents the frame in and by which the speed reducing gears are supported in connection with the measuring chamber. The frame 3 is rigidly affixed to the measuring chamber by a plurality of screws 5 which pass through the retaining lugs 6 of the frame and have screw threaded bearings in the supporting posts 7, which posts 7 are formed integrally with the measuring chamber 2. The top of the frame 3 is provided with an integrally formed screw threaded sleeve 8, which is inserted through the central aperture 9 formed in the upper wall of the housing or inclosing case 1. When the sleeve 8 has been thus inserted through the aperture 9 it is secured in place therein by the clamping nut 10, which nut 10 is turned down on the periphery of the sleeve 8 firmly against the exterior surface of the inclosing case 1, whereby all of said parts including the speed reducing gears, the gear inclosing frame and the measuring chamber are centrally suspended as stated from the center of the inclosing case 1, without the aid of additional screws, bolts or other mechanism.

A packing 17 is preferably inserted between the top of the gear supporting frame and inner wall of the case 1 to prevent the escape of water from the inclosing case around the sleeve 8. It will be obvious that by this construction the water which enters the chamber 1 through the connecting duct 12 is free to pass above, beneath and entirely around the measuring chamber 2 before escaping from the case, whereby the liability of sediment or stagnant water becoming secreted above the measuring chamber or around the speed reducing gear is entirely avoided and the entire chamber is continuously flushed and the accumulation of sediment prevented.

As a simple and most efficient means of forming a close water tight joint between the measuring chamber 2 and the walls of the measuring chamber around the outlet duct 13, I have provided such measuring chamber with a plurality of radial lugs 14 located upon the opposite side of said chamber from said outlet duct and said lugs are preferably provided with a vertical slit 15 which permits them to yield slightly by contact with the walls of the inclosing case. Thus preparatory to inclosing the measuring chamber 2 in the inclosing case 1, said measuring chamber is placed in a lathe and the exterior surfaces of the lugs 14 and the opposing bearing 16 of said chamber are milled off concentric with the vertical center of said chamber, while the opposing bearings 17, 17, and 18 of the inclosing case are also turned down or milled concentric with the vertical center of said case. This being done and the bottom 18' of the case being removed said measuring chamber is inserted from below when by turning down the clamping nut 10 on the sleeve 8, the contiguous bearings 14 and 16 of the measuring chamber and 17 and 18 of the inclosing case are brought together whereby the radial lugs 14 press against the opposing bearings 17, the bearings 16 and 18 are brought in close contact and a water tight joint is thereby formed between them. To facilitate forming a close joint between such parts, the radial arms 14 of the measuring chamber are tapered so as to extend slightly beyond the opposing bearings of the case and the slits 15 are formed to permit said radial lugs to yield sufficiently to enter within the bearing 17. Thus it will be understood as the measuring chamber is drawn into place by turning down the clamping nut 10, the bearing 16 of the measuring chamber will be brought in close contact with the opposing bearing 18 of the inclosing case and a water tight joint thereby formed between such surfaces, whereby all such parts are not only quickly and easily assembled but they are brought in perfect alinement with each other and securely retained in their proper operative relations. To facilitate assembling the several gears of the speed reducing mechanism and insure their perfect alinement with each other and their supporting frame, and also to facilitate removing the several coöperating parts when worn, I have provided a detachable circular disk 21 which is provided with a central aperture 22 for the central shaft 23 and two vertical apertures 24 and 25 for the gear shafts 26 and 27. Preparatory to attaching the frame 3, the plate 21 is placed upon the posts 7 when the ends of the several gear shafts are inserted through said apertures. This being done the frame 3 is secured to the top of said posts upon said plate by the retaining screws 5, whereby said plate is rigidly retained in place between said posts and frame when said plate and frame serve to support the upper and lower ends of the gear shafts of the reducing mechanism. It will be understood that the weight of the gears and shafts rests upon the plate 21, said plate is subject to greater wear than the other coöperating parts and that for this reason it becomes important to so connect the same with the other parts that it may be readily removed and replaced without replacing the other parts of the gear supporting frame. The gear mechanism is of substantially the ordinary construction and is connected with the index pointers in the ordinary manner and the same forms no part of the present invention. The posts 7 are preferably formed integrally with the measuring chamber 2.

It will also be understood that the registering mechanism, not shown, is inclosed in the chamber 30 and that motion is communicated thereto from the measuring disk, not shown, through the disk actuated arm 31, radial arm 32, shaft 23, pinion 14, gear 35, pinion 36, gear 37, pinion 38, gear 39, shaft 40, pinion 41, gear 42 and from thence to the registering mechanism in the case 30 through the shaft 43. The bottom 18 of the case is secured in place by a plurality of bolts 44 in the ordinary manner.

Having thus described our invention what we claim as new and desire to secure by Letters Patent is,

1. In a water meter of the class described, the combination within an inclosing case of a measuring chamber, a plurality of vertical posts formed integrally with the upper part of said chamber, a gear supporting disk supported on the upper ends of said posts, a gear frame and a plurality of gears and gear shafts supported on said disk, means for rigidly connecting said posts, disk and gear frame together, and means for suspending said gear frame and connected parts from the top of said inclosing case.

2. In a water meter of the class described, the combination within an inclosing case of a measuring chamber, a plurality of vertical posts formed integrally with the upper part of said chamber, a gear supporting disk supported on the upper ends of said posts, a gear frame and a plurality of gears and gear shafts supported on said disk, means for rigidly connecting said posts, disk and gear frame together, means for suspending said gear frame and connected parts from the top of said inclosing case, and means for forming a water tight joint between the outlet duct of said measuring chamber and the outlet duct of said inclosing case, all substantially as and for the purposes specified.

3. In a disk water meter, the combination of an exterior inclosing case, a measuring chamber located in said case milled bearing surface formed integrally with said case around its outlet aperture a plurality of yielding radial arms adapted to contact with the opposing walls of said inclosing case and thereby hold said milled bearings of said outlet aperture of the measuring chamber in close contact with the opposing bearings of the inclosing case, a sleeve centrally connected with the upper side of said measuring chamber, a measuring and a registering mechanism, means for connecting said sleeve in an aperture provided therefor in the upper side of said inclosing case, means connecting the measuring chamber with the suspension sleeve, and means for communicating motion from the measuring mechanism in said measuring chamber to said registering mechanism through the central sleeve, all substantially as and for the purpose specified.

In testimony whereof we affix our signatures in the presence of two witnesses.

FREDERICK C. BOGK.
JOHN J. LEACH.
ALBERT WM. WINGENDER.

Witnesses:
   JAS. B. ERWIN,
   M. M. SCHULZ.